United States Patent
Zhang et al.

(10) Patent No.: US 11,457,250 B2
(45) Date of Patent: Sep. 27, 2022

(54) METHOD, DEVICE, AND STORAGE MEDIUM FOR TRANSMITTING DATA

(71) Applicant: BEIJING DAJIA INTERNET INFORMATION TECHNOLOGY CO., LTD., Beijing (CN)

(72) Inventors: Xiaobo Zhang, Beijing (CN); Wei Wang, Beijing (CN); Bingyang Xiong, Beijing (CN); Chunxiang Wei, Beijing (CN); Yue Li, Beijing (CN); Zhibo Wang, Beijing (CN)

(73) Assignee: BEIJING DAJIA INTERNET INFORMATION TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/136,631

(22) Filed: Dec. 29, 2020

(65) Prior Publication Data
US 2021/0281888 A1  Sep. 9, 2021

(30) Foreign Application Priority Data
Mar. 9, 2020 (CN) .......................... 202010158976.7

(51) Int. Cl.
*H04N 21/234* (2011.01)
*H04N 21/218* (2011.01)
(Continued)

(52) U.S. Cl.
CPC ..... *H04N 21/2343* (2013.01); *H04N 21/2187* (2013.01); *H04N 21/4302* (2013.01); *H04N 21/4402* (2013.01); *H04N 21/84* (2013.01)

(58) Field of Classification Search
CPC .......... H04N 21/2343; H04N 21/2187; H04N 21/4302; H04N 21/4402; H04N 21/84
(Continued)

(56) References Cited

U.S. PATENT DOCUMENTS

| 10,897,637 B1* | 1/2021 | Pham et al. ......... H04N 21/242 725/115 |
| 11,344,801 B2* | 5/2022 | Perlman ............... H04N 19/172 |

(Continued)

FOREIGN PATENT DOCUMENTS

| CN | 104618785 A | 5/2015 |
| CN | 106385603 A | 2/2017 |

(Continued)

OTHER PUBLICATIONS

Chinese Office Action dated Jul. 8, 2021 for Application No. 202010158976.7, 18 pages.

*Primary Examiner* — Dominic D Saltarelli
(74) *Attorney, Agent, or Firm* — Frost Brown Todd LLC

(57) ABSTRACT

The disclosure can provide a method for transmitting data, an electronic device, and a computer-readable storage medium. The method can be applicable for a first electronic device, and can include the following. Playing data is received, in which the playing data includes first playing information of a target video on a second electronic device. The first playing information is obtained by parsing the playing data. Second playing information of the target video on the first electronic device is obtained. Playing of the target video on the first electronic device is adjusted based on the first playing information and the second playing information.

20 Claims, 7 Drawing Sheets

(51) Int. Cl.
  *H04N 21/43*   (2011.01)
  *H04N 21/44*   (2011.01)
  *H04N 21/84*   (2011.01)
  *H04N 21/2343*  (2011.01)
  *H04N 21/2187*  (2011.01)
  *H04N 21/4402*  (2011.01)

(58) Field of Classification Search
  USPC .......................................................... 725/116
  See application file for complete search history.

(56) References Cited

U.S. PATENT DOCUMENTS

| | | | |
|---|---|---|---|
| 2018/0192087 A1* | 7/2018 | Dudko | H04N 21/814 |
| 2021/0076107 A1* | 3/2021 | Quek | H04N 5/278 |
| 2021/0204016 A1* | 7/2021 | Deshmukh | H04N 21/43076 |
| 2021/0368223 A1* | 11/2021 | You | H04N 21/2187 |
| 2022/0007083 A1* | 1/2022 | Lin | H04N 21/23892 |

FOREIGN PATENT DOCUMENTS

| | | | |
|---|---|---|---|
| CN | 107071502 A | 8/2017 | |
| CN | 110198472 A | 9/2019 | |
| CN | 110267081 A | 9/2019 | |

\* cited by examiner

METHOD, DEVICE, AND STORAGE MEDIUM FOR TRANSMITTING DATA

CROSS-REFERENCE TO RELATED APPLICATION

This application is based on and claims priority to Chinese Patent Application No. 202010158976.7 filed on Mar. 9, 2020, the disclosure of which is hereby incorporated herein by reference.

FIELD

The disclosure relates to the field of data processing technologies, and more particularly, to a method, an electronic device, and a storage medium for transmitting data.

BACKGROUND

The live streaming industry has ushered in unprecedented prosperity with the timeliness and interactivity on information transmission as the development of Internet technologies and people's massive demand for culture and art works. A form of live streaming plus watching plays brings users a different experience, which can migrate offline movies, teleplays, short-form videos, etc. to online, and allow audiences to watch videos with guests and anchors while communicate with guests and anchors. Generally, there is a situation where the video played among audiences, guests and anchors is seriously out of synchronization during a live streaming process in the form of live streaming plus watching plays. In order to solve the out of synchronization, the audience usually determines whether the live streaming is out of synchronization. When the live streaming is out of synchronization, it needs to re-enter the live streaming room for the audience to obtain the latest live streaming data, thereby synchronizing the live streaming data.

However, the above method requires an intervention of the audience's determination and cannot quickly and accurately synchronize the live streaming data.

SUMMARY

According to embodiments of the disclosure, a method for transmitting data is provided. The method is applicable for a first electronic device and includes: receiving playing data, in which the playing data includes first playing information of a target video on a second electronic device; obtaining the first playing information by parsing the playing data; obtaining second playing information of the target video on the first electronic device; and adjusting playing of the target video on the first electronic device based on the first playing information and the second playing information.

According to embodiments of the disclosure, a method for transmitting data is provided. The method includes: obtaining playing information of a target video; generating playing data including the playing information; and transmitting the playing data through a data synchronization service.

According to embodiments of the disclosure, an electronic device is provided. The electronic device includes a processor and a storage device configured to store instructions executable by the processor. The processor is configured to execute the instructions to carry out: receiving playing data, in which the playing data includes first playing information of a target video on a second electronic device; obtaining the first playing information by parsing the playing data; obtaining second playing information of the target video on the first electronic device; and adjusting playing of the target video on the first electronic device based on the first playing information and the second playing information.

The above general description and the following detailed description are exemplary and explanatory, and cannot limit the disclosure.

BRIEF DESCRIPTION OF THE DRAWINGS

The drawings herein are incorporated into the specification and form a part of the specification, illustrating embodiments consistent with the disclosure and used together with the specification to explain the principles of the disclosure, and do not constitute undue limitations to the disclosure.

DETAILED DESCRIPTION

In order to enable those of ordinary skill in the art to better understand technical solutions of the disclosure, technical solutions in embodiments of the disclosure will be described clearly and completely as follows with reference to the drawings.

It should be noted that terms "first" and "second" in the specification and claims of the disclosure and the above-mentioned drawings are used to distinguish similar objects, and are not necessarily used to describe a specific sequence or order. It should be understood that data indicated in this way can be interchanged under appropriate circumstances so that the embodiments of the disclosure described herein can be implemented in an order other than those illustrated or described herein. The implementation manners described in the following embodiments do not represent all implementation manners consistent with the disclosure. Rather, they are merely examples of devices and methods consistent with some aspects of the disclosure as detailed in the appended claims.

Figure 1:
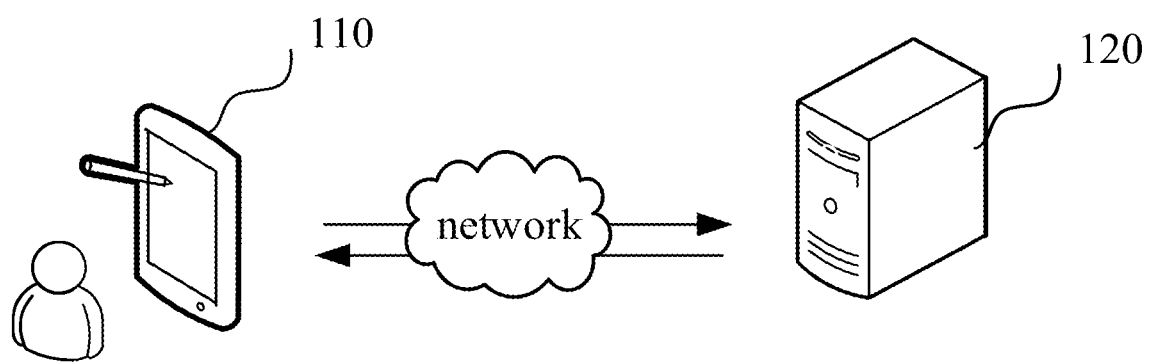
FIG. 1 is a schematic diagram illustrating an environment for implementing a method for transmitting data according to some embodiments of the disclosure.

The method for transmitting data, provided in the disclosure, can be applicable to an environment illustrated in FIG. 1. The electronic device 110 can interact with the server 120 through the network. The electronic device 110 can be expanded to include a first electronic device and a second electronic device. The first electronic device and the second electronic device can interact with each other through the server 120. That is, the first electronic device can transmit data to the server 120 through the network, and the server 120 can transmit the data to the second electronic device through the network. Also, the second electronic device can transmit data to the server 120 through the network, and the server 120 can transmit the data to the first electronic device through the network. For example, the first electronic device can receive video playing data (playing data for concision and short in the following description) provided by the second electronic device through the server, in which the playing data may include first playing information of a target video on the second electronic device. The first electronic device can obtain the first playing information by parsing the playing data. The first electronic device also can obtain playing information of the target video at a first moment, and determines the playing information of the target video at the first moment as second playing information of the target video on the first electronic device. The first electronic device can adjust playing of the target video based on the first playing information and the second playing information. The electronic device can obtain playing information of the target video, generate playing data including the playing information of the target video, and transmit the playing data through a data synchronization service. The data synchronization service can be created in advance. The first electronic device and the second electronic device can be, but are not limited to, various personal computers, notebook computers, smart phones, tablet computers, and portable wearable devices. The server 120 can be an independent server or a server cluster including servers.

Figure 2:
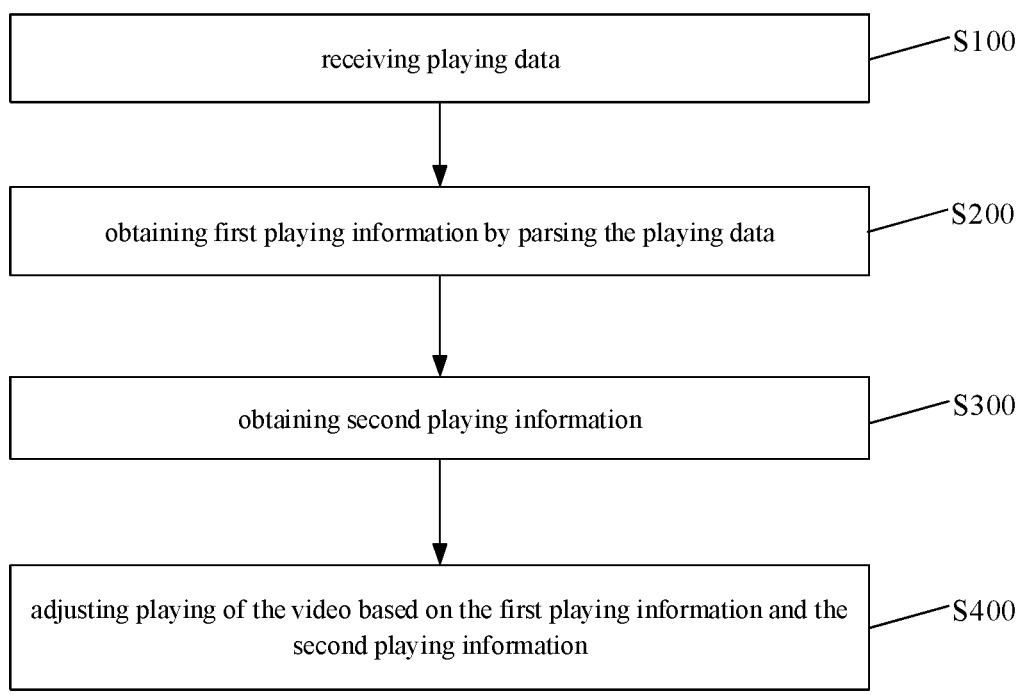
FIG. 2 is a flowchart illustrating a method for transmitting data according to some embodiments of the disclosure.

FIG. 2 is a flowchart illustrating a method for transmitting data according to some embodiments of the disclosure. As illustrated in FIG. 2, the method for transmitting data, for example which may be applicable to the first electronic device 110 illustrated in FIG. 1, may include the following.

At block S100, playing data is received. The playing data can be provided by the second electronic device. The playing data may include first playing information of a target video on the second electronic device.

At block S200, the first playing information is obtained by parsing the playing data.

At block S300, playing information at a first moment of the target video is obtained. The playing information at the first moment is determined as second playing information of the target video on the first electronic device.

At block S400, playing of the target video on the first electronic device is adjusted based on the first playing information and the second playing information.

The playing data refers to data formed by playing information of playing a movie, a series of teleplays or the like during a live streaming process, which refers to playing data corresponding to an anchor herein. The playing information refers to a playing state, a playing progress and a video identifier of playing a movie, a series of teleplays or the like during the live streaming process. For example, the playing state may be pause, playing, fast-forwarding, etc. The video identifier refers to identification information for indicating a category, a type or detail of the target video, which may be a URL (Uniform Resource Locator) address or an address corresponding to the video.

In some embodiments of the disclosure, the first moment may be a time point of the target video being played on the first electronic device when the playing data is received.

It is taken the playing information including the playing state, the playing progress and the video identifier of playing a movie, a series of teleplays or the like during the live streaming process as an example to describe. The first electronic device receives the playing data provided by the second electronic device through the server, and parses the playing data to obtain the first playing information of the target video. The playing information (second playing information) of the target video at the first moment on the first electronic device, is obtained by the first electronic device. The second playing information is compared with the first playing information by the electronic device. Under a case that the first playing information is consistent with the second playing information, it does not adjust the playing state and the playing progress of the target video on the first electronic device and maintains the playing state and the playing progress of the target video on the first electronic device. Under a case that the first playing information is not consistent with the second playing information, it indicates that the playing of the target video on the first electronic device is inconsistent with the playing of the target video on the second electronic device, the playing state and the playing progress of the target video on the first electronic device may be adjusted based on the first playing information and the second playing information, and the playing state and the playing progress of the target video on the first electronic device is aligned with the playing state and the playing progress of the target video on the second electronic device. For example, the first playing information of the target video may be the playing state on the second electronic device corresponding to an anchor during the live streaming, and the second playing information of the target video may be the playing state on the first electronic device corresponding to an audience or a guest during the live streaming.

With the above-mentioned method for transmitting data, the playing data provided by the second electronic device, may be received. The playing data may include the first playing information of the target video on the second electronic device. The playing data is parsed to obtain the first playing information. The playing information at the first moment of the target video is obtained and determined as the second playing information of the target video on the first electronic device. The playing of the target video is adjusted based on the first playing information and the second playing information. The playing data is received, and the playing of the target video is adjusted based on the first playing information, obtained by parsing the playing data, on the second electronic device and the obtained second playing information on the first electronic device. In some embodiments, the above-mentioned method may ensure that the state and the progress of the target video played on the multiple devices are unified, and improve the user experience of live streaming products.

In some embodiments, the first playing information includes at least one of: a playing state of the target video on the second electronic device, a playing progress of the target video on the second electronic device, and an identifier of the target video. In some embodiments, the second playing information includes at least one of: a playing state of the target video on the first electronic device, a playing progress of the target video on the first electronic device, and an identifier of the target video. That is, the playing information can include the playing state; the playing information can include the playing progress; and the playing information can include the identifier of the target video. Or the playing information can include the playing state and the playing progress, the playing information can include the playing state and the identifier of the target video, and the playing information can include the playing progress and the identifier of the target video. Or the playing information can include the playing state, the playing progress and the identifier of the target video. For example, in some cases that the target video does not change, the playing information includes the playing state and the playing progress; in some cases that the target video is playing normal, the playing information includes the playing progress; in some cases that the target video is paused, the playing information includes the playing state; in some cases that the target video change, the playing information includes the identifier of the target video, or the playing information includes all the playing state, the playing progress and the identifier of the target video, or the playing information includes the playing state and the identifier of the target video, or the playing information includes the playing progress and the identifier of the target video.

In detail, the playing state refers to the target video is paused, playing, or fast-forwarded. The video identifier of the target video refers to identification information for indicating a category, a type or detail of the target video, which may be a URL address or an address corresponding to the video.

In some embodiments, as an implementable manner of the action at block S100 the playing data is corresponding to a data synchronization service, the data synchronization service for synchronizing data for multiple electronic devices.

In detail, the data synchronization service corresponding to each electronic device may be different. Different data synchronization services correspond to different playing data. Based on the corresponding data synchronization service and playing data, different data synchronization services can be implemented, which may provide a data basis for the follow-up targeted synchronizing the playing information of the target video based on different data types. In some embodiments, the above-mentioned method may synchronize timely the playing information for the multiple devices, ensure the unified state and progress of the target video played on the multiple devices, and improve the user experience of live streaming products.

In some embodiments, as an implementable manner before the action at block S100, the method further includes: obtaining a playing identity; launching the data synchronization service corresponding to the playing identity; and providing an identifier of the data synchronization service to the second electronic device.

The playing identity refers to an identity of each user participating in the live streaming or an identity of an electronic device corresponding to each user participating in the live streaming. The playing identity includes an anchor, a guest and the like. The identity may be changed. For example, when the audience watching the live streaming goes to the microphone to make a speech, the corresponding playing identity of this person is changed from the audience to the guest, and when this person finishes speaking and disembarks to watch the live streaming, the corresponding playing identity of this person is changed from the guest to the audience.

In detail, the data synchronization service corresponding to the playing identity is launched based on the playing identity corresponding to the first electronic device, and the identifier of the data synchronization service is provided to the second electronic device. Therefore, the second electronic device may transmit different playing data based on the corresponding data synchronization services, and the first electronic device may receive the playing data corresponding to the data synchronization service. It may provide a data basis for the follow-up targeted synchronizing the playing information of the target video based on different data types. In some embodiments, the above-mentioned method may synchronize timely the playing information for the multiple devices, ensure the unified state and progress of the target video played on the multiple devices, and improve the user experience of live streaming products.

In some embodiments, the identifier of the data synchronization service is updated to the second electronic device in response to the data synchronization service being changed.

In detail, under a case that the type of the current data synchronization service changes, the identifier of the updated data synchronization service is provided to the second electronic device, so that the second electronic device may convert the type of the received playing data in time, and the target video may be adjusted based on the corresponding data synchronization service.

In some embodiments, an instruction for changing the playing identity is obtained, and the playing identity is changed based on the instruction.

In detail, different playing identities may be changed mutually. The playing identity may be changed based on the instruction for changing the playing identity. For example, the audience can participate in the interaction by leaving a message while watching the live streaming. However, if the audience wants to interact with the anchor by voice or video and show it to other audiences, this audience can request (for example, via putting up the microphone) to change the playing identity, and the instruction for changing the playing identity may be generated. After the request is approved, the playing identity may be changed to change from the audience to the guest. Similarly identities among audiences, anchors, and guests may be changed based on the corresponding instructions for changing the playing identity.

In the above embodiments, the playing identity is Obtained, and the data synchronization service corresponding to the playing identity is launched. The identifier of the data synchronization service is provided to the second electronic device. When the type of the current data synchronization service changes, the identifier of the updated data synchronization service is provided to the second electronic device. The instruction for changing the identity is obtained, and the playing identity is changed based on the instruction for changing the identity. The playing information can be synchronized in time for the multiple devices based on the identities and corresponding synchronization services in the live streaming process, thereby synchronizing the playing information for the multiple devices timely, ensuring the unified state and progress of the target video played on the multiple devices, and improving the user experience of live streaming products. The identities among the anchors, audiences and guests may be changed based on specific needs in the live streaming process. In some embodiments, the above-mentioned method may provide a basis for launching the data synchronization service corresponding to the playing identity and implement changes of playing identities on demand.

In some embodiments, the playing identity includes a first identity and a second identity. The data synchronization service includes a first data synchronization service and a second data synchronization service. The first identity is corresponding to the first data synchronization service, and the second identity is corresponding to the second data synchronization service.

The first identity and the second identity may be any of guests and audiences. The first data synchronization service and the second data synchronization service include, but are not limited to, any of a broadcast data sync service (BDSS) and an audio stream data sync service (ASDSS).

The BDSS system is a data exchange service system extended and derived from the user datagram protocol (UDP). The system uses the UDP protocol for data broadcasting, and can specify the type of data broadcasting, such as packet loss and anti-packet loss. The system may do the corresponding processing based on the type of data broadcasting. For example, for data of anti-packet loss, the first electronic device of the receiving end will send a corresponding ACK packet (acknowledgement data packet) if it receives this type of data, and the second electronic device of the transmitting end may retransmit and perform other behaviors in response to that the transmitting end does not receive the ACK packet. The BDSS system has the characteristics of reliability and low latency. The BDSS system can synchronize the playing of the guest singing accompaniment and the anchor accompaniment. The ASDSS system is system supporting inserting a customized data segment based on audio streams. This system is used to synchronize data to the audiences' mobile devices in the live streaming room, which may insert a customized data segment into the audio stream. The first electronic device corresponding to the audience may receive the audio stream and parse the audio stream to extract the data segment. The system can solve the problem of high-concurrency data synchronization, and has the characteristics of keeping the data stream information and the audio stream information completely synchronized. The ASDSS can solve the synchronization problem of the audience watching the video.

In some embodiments, both the first identity and the second identity can use the first data synchronization service, or both can use the second data synchronization, or the first identity can use the first data synchronization service, and the second identity can use the second data synchronization service.

In some embodiments, when it is detected that the playing identity is changed from the second identity to the first identity, the second data synchronization service is terminated and the first data synchronization service is launched. When it is detected that the playing identity is changed from the first identity to the second identity, the first data synchronization service is terminated and the second data synchronization service is launched.

When it is detected that the playing identity is changed from the second identity to the first identity, the data synchronization service, through which the playing data is received subsequently, is the first data synchronization service. Therefore, the second data synchronization service is terminated, to prevent the second data synchronization service from receiving the playing data, avoiding occupying unnecessary operating space. The first data synchronization service is launched, to provide a basis for subsequent reception of playing data through the data synchronization service. When it is detected that the playing identity is changed from the first identity to the second identity, the data synchronization service, through which the playing data is received subsequently, is the second data synchronization service. Therefore, the first data synchronization service is terminated. In some embodiments, the above-mentioned method may prevent the first data synchronization service from receiving the playing data, and avoid occupying unnecessary operating space. The second data synchronization service is launched, to provide a basis for subsequent reception of playing data through the data synchronization service.

In the above embodiments, when it is detected that the playing identity is changed from the second identity to the first identity, the second data synchronization service is terminated and the first data synchronization service is launched. When it is detected that the playing identity is changed from the first identity to the second identity, the first data synchronization service is terminated and the second data synchronization service is launched. In some embodiments, the above-mentioned method may enable subsequent reception and parsing of the playing data based on the characteristics of each playing identity, prevent unnecessary data synchronization services from receiving the playing data, avoid occupying unnecessary operating space, and provide a basis for subsequent reception of the playing data through the data synchronization service.

In some embodiments, as an implementation manner of the action at block S400, said adjusting the playing of the target video based on the first playing information and the second playing information, includes: obtaining a comparison by comparing the first playing information with the second playing information; and adjusting the playing state and the playing progress of the target video on the first electronic device based on the comparison.

The comparison may include a speech of the anchor or the guest, or the state (paused, playing, fast-forwarded and playing progress) of playing movies, a series of plays, or the like.

In detail, the first playing information is compared with the second playing information, and the playing state and the playing progress of the target video on the first electronic device of the receiving end may be adjusted based on the playing information of the target video on the second electronic device of the transmitting end.

In some embodiments, a parameter in the comparison is detected. It maintains the playing state and the playing progress of the target video on the first electronic device in response to the parameter being less than or equal to a threshold. The playing state and the playing progress of the target video on the first electronic device is updated in response to the parameter being greater than the threshold.

The threshold refers to a deviation threshold of each parameter in the comparison result. Taking the playing progress as an example, the threshold corresponding to the playing progress may be 10 seconds or 20 seconds.

In detail, under a case that the parameter in the comparison result is less than or equal to the threshold, it is considered that the deviation between the playing progress of the target video on the second electronic device of the transmitting end and the playing progress of the target video on the first electronic device of the receiving end is within a tolerable range, the comparison parties are basically synchronized, and the playing state and the playing progress of the target video on the first electronic device of the receiving end may be maintained. Under a case that the parameter in the comparison result is greater than the threshold, it is considered that the deviation between the playing progress of the target video on the second electronic device of the transmitting end and the playing progress of the target video on the first electronic device of the receiving end is large, which may affect the live streaming experience. The two parties are not synchronized, and the playing state and the playing progress of the target video on the first electronic device need to be adjusted, and the playing state and the playing progress of the target video on the first electronic device of the receiving end are updated.

In some embodiments, an identifier of the target video is detected, and video data of the target video is updated in response to the identifier of the target video being changed.

In detail, during the playing of the target video, there are requirements for continuous playing different plays. When one play is finished and another play is started, the identifier of the target video will change. At this time, the identifier of the target video needs to be updated to ensure the smooth of the live streaming process. For example, the latest playing information transmitted by the second electronic device corresponding to the anchor, includes the playing state (pause), the playing progress (2 minutes and 50 seconds), the name of the play (or the address of the play), and the second episode of the play. If the audience is still watching the first episode of the play and the first episode needs to be changed to the second episode, the first electronic device corresponding to the audience will receive data of the second episode from the server while receiving the corresponding playing information. The first electronic device corresponding to the audience adjusts the playing of the second episode of the play based on the playing state and the playing progress. In some embodiments, while obtaining the data of the updated target video, the playing data provided by the second electronic device is obtained again, and the playing state, the playing progress and the data of the target video are simultaneously updated.

In the above embodiments, the first playing information is compared with the second playing information to obtain a comparison about the target video playing. The playing state and the playing progress of the target video on the first electronic device are adjusted based on the comparison about the target video playing. In some embodiments, the method may ensure that the state and the progress of the target video played are unified, and improve the user experience of live broadcast products.

Figure 3:
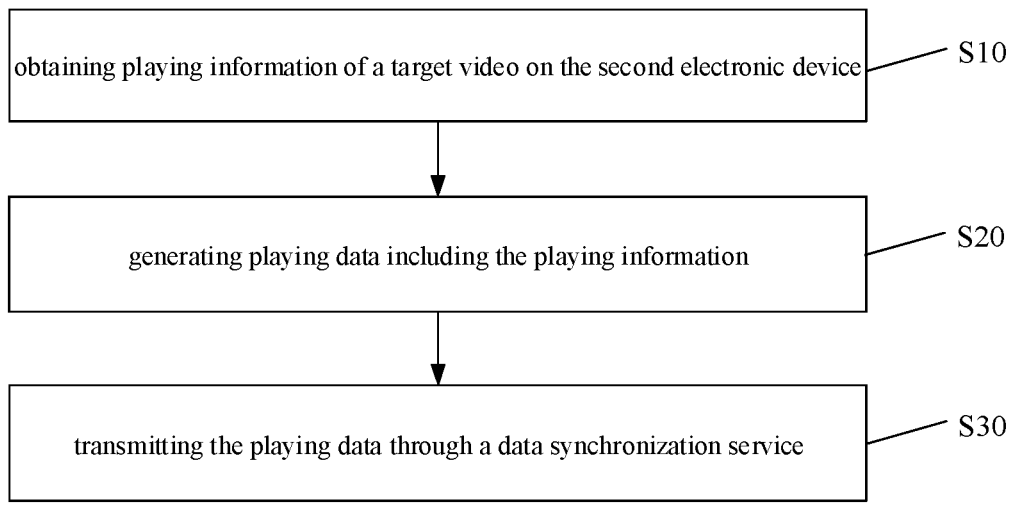
FIG. 3 is a flowchart illustrating a method for transmitting data according to some embodiments of the disclosure.

FIG. 3 is a flowchart illustrating a method for transmitting data according to some embodiments of the disclosure. As illustrated in FIG. 3, the method for transmitting data, which may be applicable to the second electronic device 112 illustrated in FIG. 1 may include the following.

At block S10, playing information of a target video on the second electronic device is obtained.

At block S20, playing data including the playing information is generated.

At block S30, the playing data is transmitted through a pre-created data synchronization service.

The playing information refers to a playing state of playing a movie, a series of teleplays or the like during the live streaming process. For example, the playing state can be paused, playing, fast-forwarded, which refers to the playing information corresponding to the anchor. The playing data refers to data formed by the playing information of playing a movie, a series of teleplays or the like during the live streaming process, which supports data synchronization services. The data synchronization service refers to a service technology used in data transmission and parsing.

In detail, the playing information of the target video is obtained, the playing data including the playing information is generated, and the playing data is transmitted through the pre-created data synchronization service. In some embodiments, the playing data is transmitted by the electronic device corresponding to the anchor, and electronic devices corresponding to the guests and audiences can receive the playing data transmitted by the electronic device corresponding to the anchor and parse the playing data, to adjust the playing state on the electronic devices corresponding to the guests and audiences.

With the above method for transmitting data, the playing information of the target video is obtained, in which the playing information is playing information of the target video on the second electronic device. The playing data including the playing information of the target video is generated. The playing data is transmitted through the pre-created data synchronization service. The playing data is generated, which provides a basis for synchronization based on the playing data. In some embodiments, the electronic device that needs to synchronize can quickly and accurately adjust the live data based on the corresponding data type after receiving the playing data.

In some embodiment, as an implementation of the action at block S10, said obtaining the playing information, includes: obtaining the playing information based on a time interval; or obtaining the playing information in response to an instruction far adjusting the target video.

In detail, the time interval may be preset. The time interval is an interval required for data transmission and data synchronization during the live streaming progress. Based on statistical data and user experience, a delay of 1-10 seconds is generally acceptable to the audience. An acceptable delay for the guest should not exceed 3 seconds, or even shorter because the guest needs to carry on real-time communication with the anchor. Therefore, for different data synchronization services, the intervals may be set differently. The time interval can be set to range from 0 to 10 seconds. Here, 0 to 10 seconds are illustrative and not used to limit the time interval.

In detail, when the time interval is 3 seconds, the playing information in the live streaming is obtained every 3 seconds, and the playing information is converted, broadcast or transmitted. Or, there is an instruction for adjusting videos in the process of playing the play. At this time, it is necessary to actively obtain, convert, broadcast or transmit the playing information. In some embodiments, in the normal playing state, the playing information in the live streaming is obtained every 3 seconds. However, in the $2^{nd}$ second of a cycle, the anchor performs the adjustment, such as pause, fast forward, and rewind. At this time, the instruction for adjusting videos may be generated based on the anchor's operation, and the playing information including the video adjustment may be obtained.

In some embodiments, the first playing data is transmitted through the first data synchronization service, and the second playing data is transmitted through the second data synchronization service.

The playing data includes first playing data and second playing data. The data synchronization service includes a first data synchronization service and a second data synchronization service. The first playing data refers to the data that is formed by the playing information of playing during the live streaming and supports the first data synchronization service. The second playing data refers to the data that is formed by the playing information of playing during the live streaming and supports the second data synchronization service. The data synchronization service refers to the service technology used in data transmission and parsing. The data synchronization service includes but not is limited to a broadcast data sync service (BDSS) and an audio stream data sync service (ASDSS). In some embodiments, the first data synchronization service may be BDSS, and the second data synchronization service may be ASDSS.

In detail, the playing information of the target video is obtained. The playing information of the target video is packaged with the different data synchronization services to obtain the first playing data and the second playing data. The first playing data is broadcast through the pre-created first data synchronization service (such as BDSS). The second playing data is transmitted through the pre-created second data synchronization service (ASDSS).

In the above embodiments, the playing information is obtained based on the time interval; or, it is detected whether there is the instruction for adjusting videos during the playing of the target video, and the playing information is obtained in response to that there is the instruction for adjusting videos. After the playing information is obtained, the electronic device corresponding to the audience and the electronic device corresponding to the guest can receive the playing information at a regular time. Based on the playing information of the anchor, the state of the electronic device corresponding to the audience and the electronic device corresponding to the guest can be adjusted synchronously. In some embodiments, the above-mentioned method may synchronize the live data quickly and accurately in real time at the preset time interval or when there is the instruction for adjusting videos without triggering the synchronous request manually.

Figure 4:
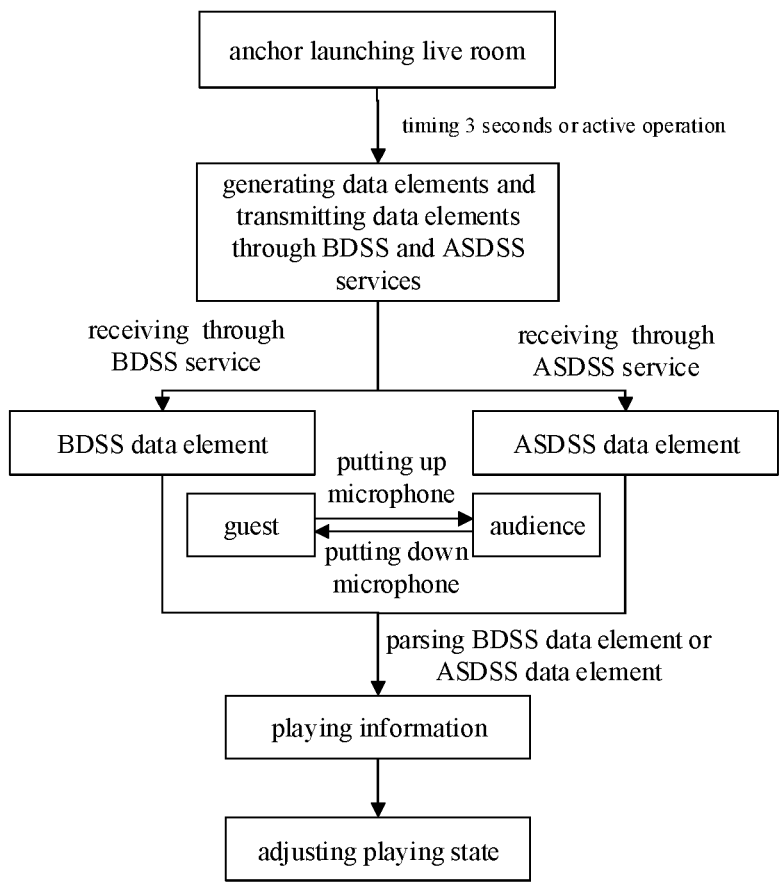
FIG. 4 is a flowchart illustrating a method for transmitting data according to some embodiments of the disclosure.

FIG. 4 is a flowchart illustrating a method for transmitting data according to some embodiments of the disclosure. Referring to FIG. 4, data synchronization and data transmission may be present in the following.

The anchor (at the side of the second electronic device) launches a live room with a small theater, selects a play in the live room, and transmits information about the play through the link to first electronic devices corresponding to the guests and audiences. The BDSS service and the ASDSS service are established and then the play is played. The information about the play will be generated to the BDSS data element and the ASDSS data element respectively, and the BDSS data element and the ASDSS data element may be transmitted through BDSS and ASDSS services respectively. In the normal playing mode, the data element is generated and transmitted every 3 seconds. When the anchor has an active operation, such as pausing, resuming, adjusting the playing progress, etc., the BDSS data element and the ASDSS data element may be generated immediately after the operation is completed and transmitted through BDSS and ASDSS services respectively.

After the first electronic device corresponding to the guest or the audience receives the information about the play, the first electronic device analyzes the information about the play, and prepares a player based on the analyzed information. The first electronic device corresponding to the guest receives the playing data (the BDSS data element) provided by the second electronic device corresponding to the anchor from the BDSS service, and obtains the first play information by parsing the playing data, such as the current playing state being paused or played, the playing progress and the identifier of the target video. The playing state and the playing progress may be adjusted by operating the player based on the first playing information, to be aligned with the playing state and the playing progress of the anchor, and to make the identifier of the target video consistent with the identifier of the target video of the anchor. The first electronic device corresponding to the audience receives the playing data (the ASDSS data element) provided by the second electronic device corresponding to the anchor from the ASDSS service, and obtains the first play information by parsing the playing data, such as the current playing state being paused or played, the playing progress and the identifier of the target video. The playing state and the playing progress may be adjusted by operating the player based on the first playing information, to be aligned with the playing state and the playing progress of the anchor, and to make the identifier of the target video consistent with the identifier of the target video of the anchor. In some embodiments, when the audience becomes a guest, the ASDSS service is destroyed and the BDSS service is created. Similarly, when the guest becomes an audience, the BDSS service is destroyed and the ASDSS service is created.

Figure 5:
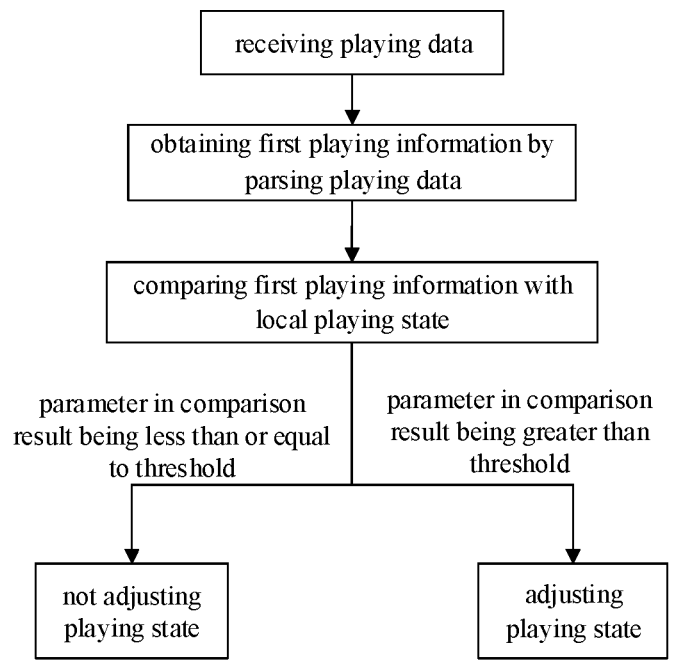
FIG. 5 is a flowchart illustrating a method for adjusting a video according to some embodiments of the disclosure.

FIG. 5 is a flowchart illustrating a method for adjusting a video according to some embodiments of the disclosure. Referring to FIG. 5, the method for adjusting the target video can include the following.

In the process of synchronously adjusting the playing state of the target video, the first electronic device at the receiving end, corresponding to the guest or the audience, receives the playing data, parses the playing data to obtain the first playing information, and compares the first playing information with the local playing state. In response to the parameter in the comparison result being less than or equal to the threshold, it is considered that the deviation of the playing progress on the second electronic device at the transmitting end and the playing progress on the first electronic device at the receiving end is within a tolerable range. The comparison parties are basically synchronized, and the playing state is not adjusted. The playing state of the target video on the first electronic device at the receiving end is maintained. In response to the parameter in the comparison result being greater than the threshold, the deviation of the playing progress on the second electronic device at the transmitting end and the playing progress on the first electronic device at the receiving end is large, which may affect the live streaming experience. The comparison parties are not synchronized, and the playing state needs to be adjusted. The playing state of the first electronic device at the receiving end is updated.

It should be understood that although the various actions in the flowcharts of FIGS. 2 through 5 are displayed in sequence as indicated by arrows, these actions are not necessarily performed in sequence in the order indicated by the arrows. Unless specifically stated in the disclosure, the execution of these actions is not strictly restricted in sequence, and these actions can be executed in other sequences. Moreover, at least part of the actions in FIGS. 2 through 5 can include a plurality of actions or stages. These actions or stages are not necessarily executed at the same time, but can be executed at different times. The execution of these actions or stages is not necessarily performed sequentially, but may be performed alternately or alternately with other actions or at least a part of the actions or stages in other actions.

Figure 6:
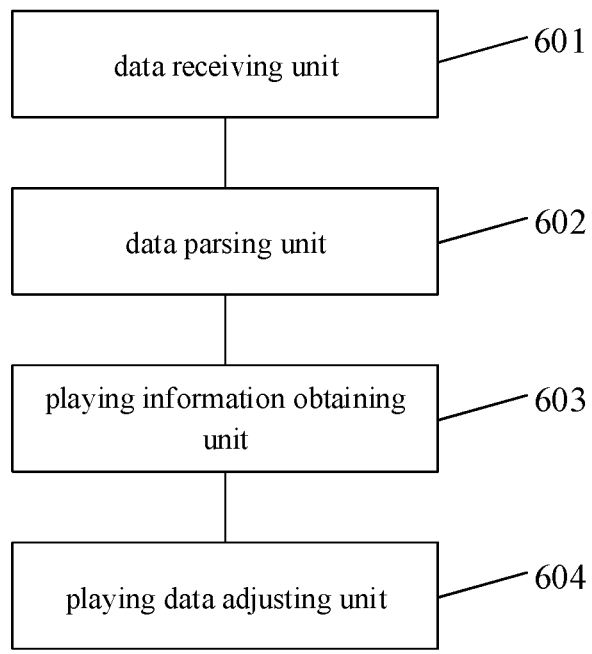
FIG. 6 is a block diagram illustrating an apparatus for transmitting data according to some embodiments of the disclosure.

FIG. 6 is a block diagram illustrating an apparatus 600 for transmitting data according to some embodiments of the disclosure. Referring to FIG. 6, the apparatus 600 includes a data receiving unit 601, a data parsing unit 602, a playing information obtaining unit 603, and a playing data adjusting unit 604. The apparatus 600 is applicable to the first electronic device.

The data receiving unit 601 is configured to playing data, in which the playing data includes first playing information of a target video on a second electronic device.

The data parsing unit 602 is configured to obtain the first playing information by parsing the playing data.

The playing information obtaining unit 603 is configured to obtain second playing information of the target video on the first electronic device.

The playing data adjusting unit 604 is configured to adjust playing of the target video on the first electronic device based on the first playing information and the second playing information.

In some embodiments, the apparatus further includes a first data storage unit. The first data storage unit is configured to store the first playing information and the second playing information. The first playing information includes at least one of: a playing state of the target video on the second electronic device, a playing progress of the target video on the second electronic device, or an identifier of the target video. The second playing information includes at least one of: a playing state of the target video on the first electronic device, a playing progress of the target video on the first electronic device, or an identifier of the target video.

In some embodiments, the playing data is corresponding to a data synchronization service, the data synchronization service for synchronizing data for multiple electronic devices.

In some embodiments, the apparatus further includes a synchronization service launching unit. The synchronization service launching unit is configured to, obtain a playing identity, launch the data synchronization service corresponding to the playing identity, and provide an identifier of the data synchronization service to the second electronic device.

In some embodiments, the synchronization service launching unit is further configured to, update the identifier of the data synchronization service to the second electronic device in response to the data synchronization service being changed.

In some embodiments, the apparatus further includes an identity adjusting unit. The identity adjusting unit is configured to, obtain an instruction for changing the playing identity, and change the playing identity based on the instruction.

In some embodiments, the apparatus further includes a first data storage unit. The first data storage unit is configured to store the playing identity and information corresponding to the data synchronization service. The playing identity includes a first identity and a second identity. The data synchronization service includes a first data synchronization service and a second data synchronization service. The first identity is corresponding to the first data synchronization service, and the second identity is corresponding to the second data synchronization service.

In some embodiments, the apparatus further includes a data synchronization service adjusting unit. The data synchronization service adjusting unit is configured to, launch the first data synchronization service and terminate the second data synchronization service in response to the identity being adjusted from the second identity to the first identity, and launch the second data synchronization service and terminate the first data synchronization service in response to the identity being adjusted from the first identity to the second identity.

In some embodiments, the playing data adjusting unit 604 is further configured to, obtain a comparison by comparing the first playing information with the second playing information, and adjust the playing state and the playing progress of the target video on the first electronic device based on the comparison.

In some embodiments, the playing data adjusting unit 604 is further configured to, detect a parameter in the comparison, maintain the playing state and the playing progress of the target video on the first electronic device in response to the parameter being less than or equal to a threshold, and update the playing state and the playing progress of the target video on the first electronic device in response to the parameter being greater than the threshold.

In some embodiments, the playing data adjusting unit 604 is further configured to, detect an identifier of the target video, and update video data of the target video in response to the identifier of the target video being changed.

Figure 7:
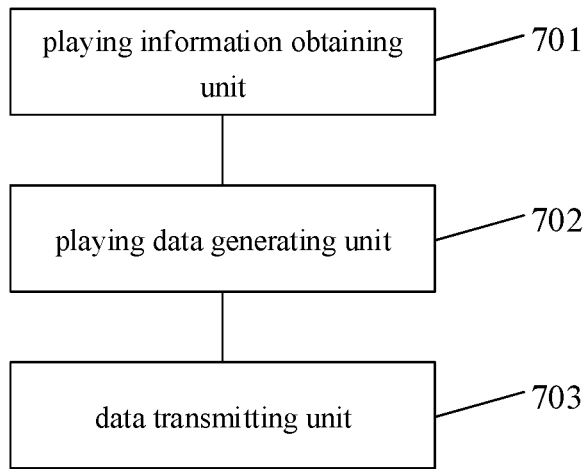
FIG. 7 is a block diagram illustrating an apparatus for transmitting data according to some embodiments of the disclosure.

FIG. 7 is a block diagram illustrating an apparatus 700 for transmitting data according to some embodiments of the disclosure. Referring to FIG. 7, the apparatus 700 includes a playing information obtaining unit 701, a playing data generating unit 702, and a data transmitting unit 703.

The playing information obtaining unit 701 is configured to obtain playing information of a target video on the second electronic device. The playing data generating unit 702 is configured to generate playing data including the playing information. The data transmitting unit 703 is configured to transmit the playing data through a data synchronization service.

In some embodiments, the playing information obtaining unit 701 is further configured to obtain the playing information based on a time interval, or obtain the playing information in response to an instruction for adjusting the target video.

In some embodiments, the playing data includes first playing data and second playing data, and the data synchronization service includes a first data synchronization service and a second data synchronization service. The playing information obtaining unit 701 is further configured to transmit the first playing data through the first data synchronization service, and transmit the second playing data through the second data synchronization service.

Regarding the apparatus according to the foregoing embodiments, the specific manner in which each module performs operations has been described in detail in embodiments of the method, and thus detailed description will not be repeated here.

Figure 8:
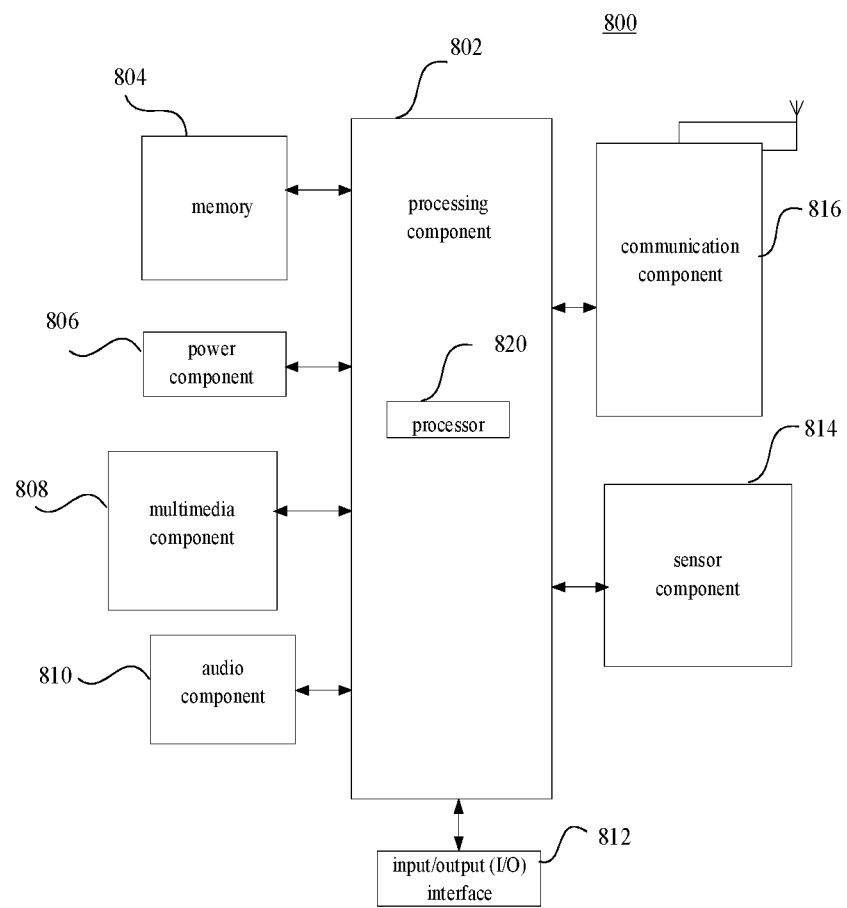
FIG. 8 is a block diagram illustrating an electronic device according to some embodiments of the disclosure.

FIG. 8 is a block diagram illustrating an electronic device 800 for data synchronization according to some embodiments. For example, the device 800 may be a mobile phone, a computer, a digital broadcast terminal, a messaging device, a game console, a tablet device, a medical device, an exercise device, a personal digital assistant, and the like.

Referring to FIG. 8, the device 800 may include one or more of the following components: a processing component 802, a memory 804, a power component 806, a multimedia component 808, an audio component 810 an input/output (I/O) interface 812, a sensor component 814, and a communication component 816.

The processing component 802 normally controls the overall operation (such as operations associated with displaying, telephone calls, data communications, camera operations and recording operations) of the device 800. The processing component 802 may include one or more processors 820 to execute instructions so as to perform all or part of the actions of the above described method. In addition, the processing component 802 may include one or more units to facilitate interactions between the processing component 802 and other components. For example, the processing component 802 may include a multimedia unit to facilitate interactions between the multimedia component 808 and the processing component 802.

The memory 804 is configured to store various types of data to support operations at the device 800. Examples of such data include instructions for any application or method operated on the device 800, contact data, phone book data, messages, images, videos and the like. The memory 804 may be realized by any type of volatile or non-volatile storage devices, or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 806 provides power to various components of the device 800. The power component 806 may include a power management system, one or more power sources and other components associated with power generation, management, and distribution of the device 800.

The multimedia component 808 includes a screen that provides an output interface between the device 800 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may sense not only the boundary of the touches or sliding actions, but also the duration and pressure related to the touches or sliding operations. In some embodiments, the multimedia component 808 includes a front camera and/or a rear camera. When the device 800 is in an operation mode such as a shooting mode or a video mode, the front camera and/or the rear camera may receive external multimedia data. Each front camera and rear camera may be a fixed optical lens system or have a focal length and an optical zoom capability.

The audio component 810 is configured to output and/or input an audio signal. For example, the audio component 810 includes a microphone (MIC) that is configured to receive an external audio signal when the device 800 is in an operation mode such as a call mode, a recording mode, and a voice recognition mode. The received audio signal may be further stored in the memory 804 or transmitted via the communication component 816. In some embodiments, the audio component 810 further includes a speaker for outputting audio signals.

The I/O interface 812 provides an interface between the processing component 802 and a peripheral interface unit. The peripheral interface unit may be a keyboard, a click wheel, a button and so on. These buttons may include, but are not limited to, a home button, a volume button, a start button, and a locking button.

The sensor component 814 includes one or more sensors for providing the device 800 with various aspects of status assessments. For example, the sensor component 814 may detect an ON/OFF state of the device 800 and a relative positioning of the components. For example, the components may be a display and a keypad of the device 800. The sensor component 814 may also detect a change in position of the device 800 or a component of the device 800, the presence or absence of contact of the user with the device 800, the orientation or acceleration/deceleration of the device 800 and a temperature change of the device 800. The sensor component 814 may include a proximity sensor configured to detect the presence of nearby objects without any physical contact. The sensor component 814 may also include a light sensor (such as a CMOS or a CCD image sensor) for use in imaging applications. In some embodiments, the sensor component 814 may further include an acceleration sensor, a gyro sensor, a magnetic sensor, a pressure sensor, or a temperature sensor.

The communication component 816 is configured to facilitate wired or wireless communication between the device 800 and other devices. The device 800 may access a wireless network based on a communication standard such as 2G, 3G, 4G, 5G or a combination thereof. In some embodiments, the communication component 816 receives broadcast signals or broadcast-associated information from an external broadcast management system via a broadcast channel In some embodiments, the communication component 816 further includes a near field communication (NFC) module to facilitate short range communication. For example, the NFC module may be implemented based on radio frequency identification (RFID) technology, infrared data association (IrDA) technology, ultra-wide band (UWB) technology, Bluetooth (BT) technology and other technologies.

In some embodiments, the device 800 may be implemented by one or a plurality of application specific integrated circuits (ASICs), digital signal processors (DSPs), digital signal processing devices (DSPDs), programmable logic devices (PLDs), field programmable gate arrays (FPGA), controllers, microcontrollers, microprocessors, or other electronic components, so as to perform the above image conversion method.

In some embodiments, there is also provided a non-transitory computer readable storage medium including instructions, such as a memory 804 including instructions. The instructions are executable by the processor 820 of the device 800 to perform the above method. For example, the non-transitory computer readable storage medium may be a ROM, a random-access memory (RAM), a CD-ROM, a magnetic tape, a floppy disk, an optical data storage device, etc.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for transmitting data for a first electronic device, comprising:
    obtaining a playing identity of the first electronic device;
    determining data synchronization service corresponding to the playing identity;
    in a procedure of playing a target video, receiving playing data in a preset time interval by the data synchronization service corresponding to the playing identity, wherein the playing data comprises first playing information of the target video on a second electronic device, the preset time interval is determined based on the data synchronization service corresponding to the playing identity;
    obtaining the first playing information by parsing the playing data;
    obtaining second playing information of the target video on the first electronic device; and
    adjusting playing of the target video on the first electronic device based on the first playing information and the second playing information.

2. The method as claimed in claim 1,
    wherein, the first playing information comprises at least one of: a playing state of the target video on the second electronic device, a playing progress of the target video on the second electronic device, or an identifier of the target video; and wherein, the second playing information comprises at least one of: a playing state of the target video on the first electronic device, a playing progress of the target video on the first electronic device, or an identifier of the target video.

3. The method as claimed in claim 2, said adjusting the playing of the target video based on the first playing information and the second playing information, comprising:
obtaining a comparison by comparing the first playing information with the second playing information; and
adjusting the playing state and the playing progress of the target video on the first electronic device based on the comparison.

4. The method as claimed in claim 3, said adjusting the playing state and the playing progress of the target video on the first electronic device based on the comparison, comprising:
detecting a parameter in the comparison;
maintaining the playing state and the playing progress of the target video on the first electronic device in response to the parameter being less than or equal to a threshold; and
updating the playing state and the playing progress of the target video on the first electronic device in response to the parameter being greater than the threshold.

5. The method as claimed in claim 3, said adjusting the playing of the target video based on the first playing information and the second playing information, comprising:
detecting an identifier of the target video; and
updating video data of the target video in response to the identifier of the target video being changed.

6. The method as claimed in claim 1, wherein the playing data is corresponding to the data synchronization service, the data synchronization service configured to synchronize data for multiple electronic devices.

7. The method as claimed in claim 6, further comprising:
providing an identifier of the data synchronization service to the second electronic device.

8. The method as claimed in claim 7, further comprising:
updating the identifier of the data synchronization service to the second electronic device in response to the data synchronization service being changed.

9. The method as claimed in claim 7, further comprising:
obtaining an instruction for changing the playing identity; and
changing the playing identity based on the instruction.

10. The method as claimed in claim 7, wherein the playing identity comprises a first identity and a second identity, the data synchronization service comprises a first data synchronization service and a second data synchronization service, the first identity is corresponding to the first data synchronization service, and the second identity is corresponding to the second data synchronization service.

11. The method as claimed in claim 10, further comprising:
launching the first data synchronization service and terminating the second data synchronization service in response to the playing identity being changed from the second identity to the first identity; and
launching the second data synchronization service and terminating the first data synchronization service in response to the playing identity being changed from the first identity to the second identity.

12. A method for transmitting data for a second electronic device, comprising:
obtaining a playing identity of a first electronic device;
determining data synchronization service corresponding to the playing identity of the first electronic device;
in a procedure of playing a target video, obtaining playing information of the target video on the second electronic device based on a preset time interval, wherein the preset time interval is determined based on the data synchronization service corresponding to the playing identity of the first electronic device;
generating playing data including the playing information; and
transmitting the playing data through the data synchronization service.

13. The method as claimed in claim 12, said obtaining the playing information, comprising:
obtaining the playing information based on a time interval; or
obtaining the playing information in response to an instruction for adjusting the target video.

14. The method as claimed in claim 12,
wherein, the playing data comprises first playing data and second playing data;
the data synchronization service comprises a first data synchronization service and a second data synchronization service;
said obtaining the playing information, comprises:
transmitting the first playing data through the first data synchronization service; and
transmitting the second playing data through the second data synchronization service.

15. An electronic device, comprising:
a processor; and
a storage device for storing executable instructions,
wherein the processor is configured to execute instructions to carry out:
obtaining a playing identity of the first electronic device;
determining data synchronization service corresponding to the playing identity;
in a procedure of playing a target video, receiving playing data in a preset time interval by the data synchronization service corresponding to the playing identity, wherein the playing data comprises first playing information of the target video on a second electronic device, the preset time interval is determined based on the data synchronization service corresponding to the playing identity;
obtaining the first playing information by parsing the playing data;
obtaining second playing information of the target video on the first electronic device; and
adjusting playing of the target video on the first electronic device based on the first playing information and the second playing information.

16. The electronic device as claimed in claim 15, wherein the playing data is corresponding to the data synchronization service, the data synchronization service for synchronizing data for multiple electronic devices.

17. The electronic device as claimed in claim 16, wherein the processor is further configured to execute instructions to carry out:
providing an identifier of the data synchronization service to the another electronic device.

18. The electronic device as claimed in claim 17, wherein the processor is further configured to execute instructions to carry out:

updating the identifier of the data synchronization service to the second electronic device in response to the data synchronization service being changed.

19. The electronic device as claimed in claim 17, wherein the processor is further configured to execute instructions to carry out:
   obtaining an instruction for changing the playing identity; and
   changing the playing identity based on the instruction.

20. The electronic device as claimed in claim 17, wherein the playing identity comprises a first identity and a second identity, the data synchronization service comprises a first data synchronization service and a second data synchronization service, the first identity is corresponding to the first data synchronization service, and the second identity is corresponding to the second data synchronization service;
   the processor is further configured to execute instructions to carry out:
   launching the first data synchronization service and terminating the second data synchronization service in response to the playing identity being changed from the second identity to the first identity; and
   launching the second data synchronization service and terminating the first data synchronization service in response to the playing identity being changed from the first identity to the second identity.

* * * * *